UNITED STATES PATENT OFFICE.

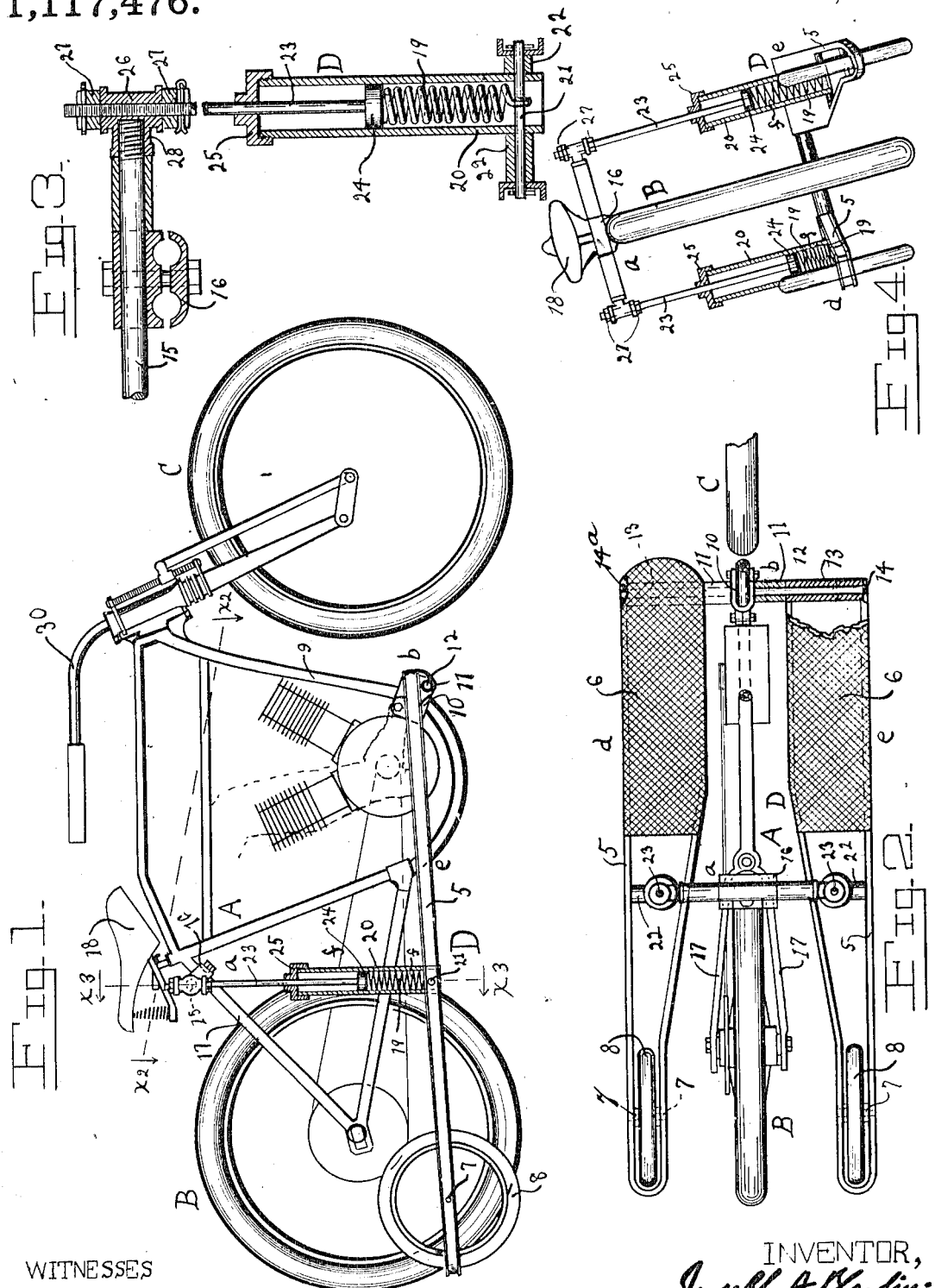

JOSEPH A. BLONDIN, OF LOS ANGELES, CALIFORNIA.

STABILIZING MEANS FOR MOTOR VEHICLES.

1,117,476.  Specification of Letters Patent.  Patented Nov. 17, 1914.

Application filed April 4, 1913. Serial No. 758,809.

*To all whom it may concern:*

Be it known that I, JOSEPH A. BLONDIN, a citizen of the United States, residing at Los Angeles, in the county of Los Angeles and State of California, have invented new and useful Improvements in Stabilizing Means for Motor-Vehicles, of which the following is a specification.

This invention relates to motorcycles or motor-propelled single-tread vehicles, and it has for its object to provide means operating in part automatically and in part under the control and influence of the rider or operator of the vehicle, which means will act to stabilize the vehicle and the vehicle plus the rider, such means constituting a working and operative part of the vehicle for stabilizing purposes, and being built into the vehicle construction or applied thereto and detachable therefrom as an attachment. Such means are intended to produce the stabilizing effect both when the vehicle is in motion and at rest; and in the latter case act to support the vehicle in upright position without the addition of any other means or devices.

One particular objection and inconvenience attaching to the use and driving of motorcycles and similar vehicles, consists in the necessity of arduously balancing the machine during periods of cessation of movement and during periods of slow progress; and even under high speed of movement more or less continuous balancing effort is required, requiring particular attention to the balancing operation and a deft manipulation of the steering wheel to maintain such balance. It is also customary to provide an adjustable prop or brace for maintaining the vehicle in upright position when it is not in use. In accordance with the present invention I provide stabilizing or balancing means largely automatic in operation, but into the operation and application of which the lateral shifting of the person of the rider enters as a factor, as does the varying application of pressure of the feet of the rider. The instinctive balancing actions of the rider are thus utilized in the application and operation of the improved balancing and stabilizing means. In a sense, these balancing means constitute artificial extensions of the pedal extremities of the rider through which instrumentalities, acting upon the roadway through rotating surfaces, the balancing of the vehicle is accomplished or assisted. Such balancing means serve likewise as foot rests for the feet of the rider of the vehicle.

The invention has for particular objects the provision of improved motorcycle construction, or construction of means attachable to and detachable from motorcycles or similar vehicles, which will be superior in point of relative simplicity and inexpensiveness of construction and organization, facility of attachment and detachment if desired, positiveness in operation, convenience in use, compactness in form, and durability, and which will be sightly in appearance and generally superior in efficiency and serviceability.

With the above and other objects in view, the invention consists in the novel and useful provision, formation, construction, combination, association and relative arrangement of parts, members and features, all as hereinafter described, shown in the drawing and finally pointed out in claims.

In the drawing: Figure 1 is a side elevation of the frame and wheels and main features of a motorcycle organized in accordance with the invention and illustrating in dotted line a portion of the person of a rider as applied in operating the invention; Fig. 2 is a fragmentary longitudinal sectional view of the same, taken upon the lines $x^2$—$x^2$, Fig. 1, and looking in the direction of the appended arrows; Fig. 3 is an enlarged fragmentary sectional view taken on the line $x^3$—$x^3$, Fig. 1, and looking in the direction of the appended arrows; and Fig. 4 is a fragmentary and sectional rear end elevation of the construction shown in Fig. 1, being illustrative of the mode of operation of the invention.

Corresponding parts in all the figures are designated by the same reference characters.

Referring with particularity to the drawing, A designates the main frame and B the drive wheel and C the steering wheel of a motorcycle or similar vehicle, and D stabilizing or balancing means applied thereto or incorporated in the construction thereof, all in accordance with and in one embodiment of the invention. In the main, the stabilizing or balancing means D comprise two members, $d$ and $e$, disposed at opposite sides of the longitudinal vertical plane of the motorcycle main frame A and the wheels connected therewith, there being operative connections, at $a$ and $b$, between such members and the main frame of the vehicle.

With each of such members one of the feet of the rider coöperates in certain of the balancing operations, the feet being normally at all times in engagement with such members to assist in the balancing operations and in such phases thereof as are not purely automatic with respect to the stabilizing means separately considered. The members $d$ and $e$ thus serve also as foot-rests for the feet of the rider at all times in the operation of the vehicle. The said members $d$ and $e$ are connected with the main frame at the operative connections $b$ so that such members may swing in arcs cutting the roadway; and the operative connections $a$ accommodate such swing.

A particular formation, construction and combination of features embodying the invention is as follows: Each of the members $d$ and $e$ consists of an elongated frame 5, which may suitably be of channel iron construction, such frame having a broader forward portion provided with a foot-plate or treadle 6, and a relatively narrow rear portion spanned by an axle 7 upon which is mounted a contact wheel 8 accommodated between the sides of the frame. At their forward ends these frames 5 are connected with the main frame A, preferably at a forward and upwardly directed member 9 thereof, by the operative connections $b$. Such operative connections comprise a split clamp 10 bolted on to such frame member 9 and having a transverse sleeve 11 through which is passed a transverse shaft 12 the outer ends of which are received in fixed sleeves 13 at the forward ends of the respective frames 5. One end of the shaft 12 may be headed, as at 14, and the other end provided with a detachable key or cotter pin 14$^a$. The frames 5 are thus capable of vertical oscillation upon their forward fulcra at the shaft 12.

The frames 5 range laterally of the main frame A longitudinally of the same, and the wheels 8 at the rear ends of such frames have tractive engagement with the roadway at corresponding points slightly rearward of the points of tractive engagement of the drive wheel B with the roadway.

The operative connections $a$ comprise a transverse shaft 15 which is passed through a split clamp 16 which may conveniently be attached to the rearwardly and downwardly extending members 17 of the main frame A, preferably just beneath the saddle or seat 18. This shaft ranges transversely of the main frame A, being somewhat shorter than the shaft 12 of the operative connections $b$ and preferably parallel therewith, and projects above the frames 5, at its ends, intermediate of the ends of such frames, preferably substantially centrally of their lengths. $f$ designates compression means included in the operative connections $a$, one for each of the members $d$ and $e$, and extending between the respective ends of the shaft 15 and the frames 5. Such compression means may comprise a coiled compression spring 19 housed within a tubular member 20, the lower end of each of such tubular members being held to one of the frames 5, pivotally, by a shaft 21 passed through such tubular member 20 and held detachably at its ends in the side members of the respective frame 5, spacing blocks 22 being interposed between the member 20 at the respective sides thereof and spaced channel-iron side members of such frame 5. Within each of the tubular members 20 plays a plunger 23 having a piston head 24 applied to the top of the spring 19, such plunger being guided in a detachable perforated cap 25 at the top of the tubular member. The stem of the plunger is received at its upper end in threaded connection with a T-pipe 26, within which it may be adjusted, and it is held in position of adjustment by lock nuts 27. The body 28 of the T-pipe is loosely threaded upon the respective end of the shaft 15, as at 29. The tension means $f$ therefore range substantially vertically at opposite sides of the main frame A between the ends of the transverse shaft 15 and the respective members $d$ and $e$.

The laterally disposed members $d$ and $e$ are preferably confined within a compass bounded laterally by the confines of the extension and play of the handle bars 30 by which the steering wheel C is manipulated, so that there is no objectionable lateral extension requiring any added width to the path of movement of the vehicle. The wheels 8 are preferably tired in the same manner as the main supporting wheels of the vehicle.

It follows from the above description that the operative connections $a$ are in a vertical plane intermediate of the vertical plane of the operative connections $b$ and the vertical plane of the traction wheels or road wheels or contact wheels 8.

The operation, method of use and advantages of the improvements in motorcycles embodying the invention as hereinabove set forth and shown in the drawing, will be readily understood by those skilled in the art, but a further statement will be made in elaboration of such mode of operation and the results thereof. It will be manifest that the stabilizing means, members $d$ and $e$, will keep the vehicle in upright position when it is not in use, acting as side props, thus holding up the vehicle through the operative connections $a$ and $b$, and the efficiency of the springs 19 or tension means $f$ is just sufficient to cause such members $d$ and $e$ to hold the vehicle upright when it is not in motion or in use. When the machine is under way or in motion, the members $d$ and $e$ will automatically, that is entirely of themselves, without the assistance or volition of the rider, tend to maintain the vehicle in upright position, acting in the same manner as props moving with the vehicle and contacting rotatively at their rear ends with the road by means of the road wheels 8. If a disturbance of equilibrium or balance occurs in the machine, the member *d* or *e* at the lowered side of the machine, because of the relatively lowered or inclined frame-side, tends to rise relatively to the main frame, due to the shortening of the distance between the shaft 15 and the member *d* or *e* at that side of the machine. This tendency to rise is converted into a further compression of the spring 19 at that side of the machine, such further compression acting through the plunger 23 and upon the respective end of the shaft 15 to boost or elevate the main frame at that side of the machine, upon the wheels as pivotal points, tending to restore transverse equilibrium of the machine. Any over-exertion of this tendency will be counteracted by a similar activity of the member *d* or *e* at the other side of the machine, together with its tension means *f* and the parts of the operative connections *a*. Likewise, when the rider is in position upon the seat or saddle 18, when such disturbance of transverse equilibrium occurs, the natural tendency of the rider will be to tilt his body toward the high side, or in a direction the opposite of the direction of inclination, and this instinctive movement of the rider will bring greater pressure to bear through his foot upon the high side of the machine, such pressure being conveyed forwardly upon the member *d* or *e* at the high side of the machine and applied to the respective end of the shaft 12 in downward pressure assisting in the elevation of the depressed side of the machine, by depressing the machine at the high side, the wheels of the machine acting as the pivotal points of such movement. The two actions therefore, namely that of elevation by the tension means through the operative connections *a*, and depression of the machine through the operative connection *b*, thus complement each other, effectively restoring transverse equilibrium of the machine. Any over-balance obtained, or tendency to over-balance produced, will be opposed by the proper compression means *f*, and likewise by instinctive shifting of the person of the rider and the consequent variation of pressure upon the members *d* and *e* or the foot plate 6 thereof, through the rider's feet. The rider will instinctively endeavor to keep his foot upon the foot-plate of the member at the high side of the machine, as the rider endeavors to maintain an upright position, with the result above set forth. Under normal balanced conditions of operation the feet rest with equal pressure upon the foot plates 6 or members *d* and *e* which thus serve merely as foot rests.

The operative effect of the compression member *f* and the attendant features is clearly illustrated in Fig. 4, in which the vehicle is shown in disturbed transverse equilibrium, the spring 19 of the compression means at the lowered side of the machine being put under increased compression. It is manifest that the members *d* and *e* and the operative connections *a* and *b*, and the other associated features of the stabilizing or balancing means D, may be readily attached to and detached from the main frame of the vehicle, by means of the clamps 10 and 16, thus permitting the stabilizing or balancing means to be supplied as a separate device or mechanism and applied to vehicles for use in connection with which such means are constructed, or, of course, the stabilizing means may be built into or built upon the vehicle and constitute an actual part of its original construction.

By utilizing a motorcycle or similar vehicle constructed or equipped in accordance with the invention, the vehicle is conveniently and semi-automatically maintained in equilibrium, or restored to equilibrium when a disturbance occurs, and when the vehicle is not in motion or use it is maintained in upright position without the application or manipulation of any particular means or devices adapted for such performance.

I do not desire to be understood as limiting myself to the particular provision, construction and detail organization and arrangement of parts and features as herein disclosed, further than as required by a fair interpretation of the invention and consideration of the terms of the following claims.

Having thus described my invention, I claim and desire to secure by Letters Patent:

1. A single-tread vehicle provided at each side with a separate stabilizing member mounted to oscillate and adapted for separate permanent contact with the roadway, operative connections between each member and the frame of the vehicle at the center of oscillation of the member, and other operative connections between each member, and the frame of the vehicle at a point of the member remote from such center of oscillation for yieldingly holding such member in permanent contact with the roadway.

2. A single-tread vehicle provided at each side with a separate stabilizing member mounted to oscillate and adapted for permanent contact with the roadway, operative connections between each member and the frame of the vehicle at the center of oscillation of the member, and other operative connections between each member and the frame of the vehicle at a point of the member remote from such center of oscillation and in proximity to the point of support of the rider of the vehicle for yieldingly holding such member in permanent contact with the roadway.

3. A single-tread vehicle provided at each side with a separate stabilizing member mounted to oscillate and adapted for permanent contact with the roadway, operative connections between each member and the frame of the vehicle at the center of oscillation of the member, and other operative connections between each member and the frame of the vehicle at a point of the member remote from such center of oscillation and yieldingly opposing the oscillation of each of such members.

4. A single-tread vehicle provided at each side with a separate stabilizing member mounted to oscillate and adapted for permanent contact with the roadway, operative connections between each member and the frame of the vehicle at the center of oscillation of the member, and other operative connections between each member and the frame of the vehicle at a point of the member remote from such center of oscillation and yieldingly opposing the oscillation of each of such members; each of said members having a wheel adapted to engage with the roadway at a point rearward of the point of contact of the rear wheel of the vehicle with the roadway.

5. A single-tread road vehicle, provided at each side with a separate oscillating foot rest adapted for permanent contact with the roadway; and means yieldingly opposing the oscillation of each of said foot rests and for holding the foot rest in permanent contact with the roadway; each of said foot rests being pivotally connected with the frame of the vehicle at a separate side of such frame and laterally thereof, and being further connected with the frame of the vehicle adjacent to the point of support of the rider of the vehicle and laterally of the frame of the vehicle.

6. A single-tread road vehicle, provided at each side with a separate oscillating foot rest adapted for permanent contact with the roadway; and means yieldingly opposing the oscillation of each of said foot rests and for holding the foot rest in permanent contact with the roadway; each of said foot rests being pivotally connected with the frame of the vehicle at a separate side of such frame and laterally thereof, and being further connected with the frame of the vehicle adjacent to the point of support of the rider of the vehicle and laterally of the frame of the vehicle; each of said foot rests being thus pivotally connected with the frame of the vehicle forward of the point of support of the rider, and having a wheel for contact with the roadway at a point rearward of the point of contact of the rear wheel of the vehicle with the roadway.

7. A single-tread vehicle provided forward of the point of support of the rider with a transverse shaft and adjacent to the point of support of the rider with a transverse shaft, foot rests pivotally connected at the respective sides of the frame of the vehicle and at their forward ends to ends of said first mentioned shaft, wheels at the rearward ends of said foot rests adapted for engagement with the roadway, and compression means between said foot rests and ends of said second mentioned shaft at points intermediate of said first mentioned shaft and said wheels.

In testimony whereof, I have signed my name to this specification in the presence of two subscribing witnesses.

JOSEPH A. BLONDIN.

Witnesses:
V. J. COBB,
D. M. CUMMINGS.